Jan. 29, 1929. 1,700,661
A. O. APPELBERG
THERMOSTATIC CONTROL SYSTEM FOR ELECTRIC HEAT PRODUCING APPARATUS
Filed Sept. 11, 1925
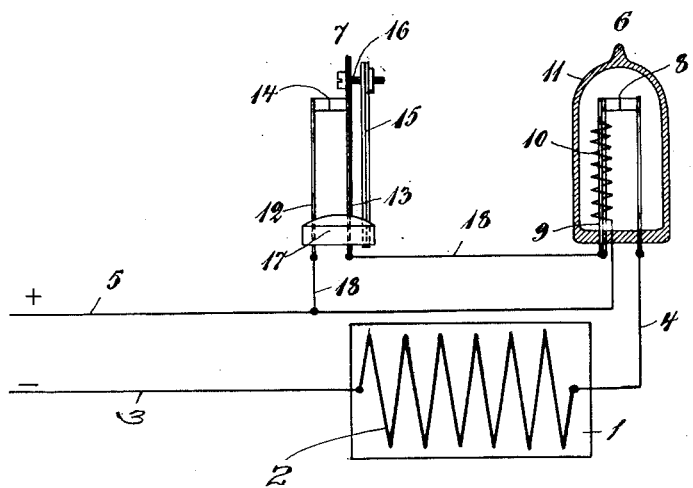

Patented Jan. 29, 1929.

1,700,661

UNITED STATES PATENT OFFICE.

AXEL OSVALD APPELBERG, OF STOCKHOLM, SWEDEN, ASSIGNOR TO AKTIEBOLAGET BIRKA REGULATOR, OF STOCKHOLM, SWEDEN.

THERMOSTATIC CONTROL SYSTEM FOR ELECTRIC HEAT-PRODUCING APPARATUS.

Application filed September 11, 1925, Serial No. 55,859, and in Germany November 3, 1924.

The invention relates to thermostatic control systems for electric heat-producing apparatus and particularly systems which comprise two co-operating thermostatic switches one of which is arranged in thermal relation with the heat-producing apparatus or the substance to be heated respectively and adapted to control the operating circuit of the other switch so as to cause the latter to open the circuit of the heat-producing apparatus at a certain temperature of said apparatus. The principal object of the invention is to improve such regulating devices with a view to removing the deficiency which it has in common with thermostatic switches in general and which consists in the break contacts of the switches being soon damaged by arcing owing to the slow operation of the switches. It has already been suggested to make the break contacts of thermostatic switches more durable by enclosing the thermostatic switch in a closed receptacle which is evacuated or filled with an inert gas respectively. This method is, however, not generally applicable in respect of such switches which must be adjustable for different temperatures. In the combination of switches above referred to it is generally required that one of the switches, viz, that one which is arranged in thermal relation with the heat-producing apparatus, should be adjustable for different temperatures and as a consequence this switch must be arranged to operate in air, whereas the other switch may conveniently be enclosed in an evacuated or gas-filled receptacle. The present invention has particularly for its object to improve the working conditions for the switch first mentioned by providing a circuit arrangement which is adapted to reduce considerably the voltage as well as the amount of current to be controlled by the said switch.

The invention will be more closely described with reference to the accompanying drawing, which shows an embodiment of a thermostatic control system according to the invention.

The electric apparatus 1 to be heated, which may be an electric cooking apparatus, a radiator or other heat-producing apparatus, is shown quite schematically as its construction is of no importance to this invention. It comprises a heater 2 included in the main circuit 3, 4, 5 of the apparatus. For the purpose of regulating the temperature of the apparatus there are provided two thermostatic switches, viz a main switch 6 included in the main circuit, and an auxiliary switch 7 adapted to control the main switch 6.

The switch contact 8 of the main switch 6 is adapted to be opened and closed by means of a bi-metallic stem 9 provided with a heating winding 10 included in the main circuit in series with the heat-producing apparatus 1 one end of the winding being connected to the stem 9 and the other to the lead 5. The whole switch is enclosed in a closed glass receptacle 11 which is evacuated or filled with an inert gas.

The auxiliary switch 7 consists of two plate springs 12, 13 carrying the contact pieces of the switch contact 14, and a bi-metallic stem 15 adapted to connect the free end of the spring 13 by means of the head of a set-screw 16 extending through a hole in said spring and threaded into the end of the stem 15. On the drawing the spring 13 is shown partly in section. The springs and the stem are secured to a suitable support 17 in such a manner that the switch contact 14 will be opened when the bi-metallic stem 15 is heated to a certain temperature. By setting the screw 16 the switch may, evidently, be adjusted to open at different temperatures. The switch contact 14 is included in a short-circuit 18 connected across the heating winding 10 of the main switch.

The auxiliary switch 7 is arranged in thermal relation with the heat-producing apparatus 1 or the substance to be heated by said apparatus, whereas the main switch 6 may be located at any suitable place. When the heat-producing apparatus or the substance to be heated respectively reaches a certain temperature, the auxiliary switch 7 will open the short-circuit of the heating winding 10 which, consequently, will be traversed by the main current. The switch 6 will then operate to open the main circuit whereby the apparatus 1 as well as the heating winding 10 are made currentless. The main switch will, consequently, again close the main circuit. As long as the temperature of the apparatus 1 is higher than that for which the auxiliary switch 7 is adjusted to operate, the main switch 6 will continue to make and break the main circuit thereby reducing the amount of energy supplied to the said circuit so as to prevent overheating of the apparatus 1.

It appears from the above that the main function of the auxiliary switch is to switch the heating winding 10 of the main switch on and off. It also appears that in the circuit arrangement shown this switching operation may take place without any considerable arcing at the switch contact 14 as the voltage at this contact in the breaking moment is only a small fraction of the main voltage between the leads 3 and 5 the heat-producing apparatus acting as a voltage reducing resistance for the heating winding 10. In this particular combination of switches the use of a main switch enclosed in an evacuated or gas-filled receptacle also contributes to lowering the voltage across the heating winding. This is due to the fact that such switches may be made more sensitive and they may therefore be operated by a very small amount of energy, while using a low resistance for the heating winding 10. The potential across the winding 10 may thus be reduced to such an extent that the arcing at the break contact of the auxiliary switch 7 will be practically insignificant.

As a precautionary measure for preventing over-heating of the apparatus in case the auxiliary switch 7 should fail to operate, the main switch 6 may also be arranged in thermal relation with the apparatus or the substance to be heated so as to operate as an automatic cut-out. In this case the main switch must be adapted to operate under the direct influence of the heat delivered from the apparatus so as to open the main circuit when the apparatus or the substance to be heated reaches a temperature that is somewhat higher than the maximum working temperature. This arrangement has the further advantage that the energy required for operating the main switch is still more reduced and, consequently, the resistance of the heating winding and the voltage between the ends of the winding may also be reduced in a corresponding degree.

I claim:

1. A thermostatic control system comprising an electric heat-producing apparatus, a main circuit for said apparatus, a thermostatic main switch included in said main circuit, a heating winding for said switch, a sealed receptacle enclosing said switch, and a thermostatic auxiliary switch arranged in thermal relation with the heat-producing apparatus and adapted to be operated at a certain temperature of said apparatus in such a manner as to cause the current of said apparatus to pass through the heating winding.

2. A thermostatic control system comprising an electric heat-producing apparatus, a thermostatic main switch adapted to make and break the circuit of said apparatus, a heating winding for said switch, a sealed receptacle enclosing said switch, a short-circuit for said winding and a thermostatic auxiliary switch arranged in thermal relation with the heat producing apparatus and adapted to open said short-circuit at a certain temperature of said apparatus.

3. A thermostatic control system comprising an electric heat-producing apparatus, a thermostatic main switch adapted to control the circuit of said apparatus, a heating winding for said switch, connected in series with the heat-producing apparatus, a sealed receptacle enclosing said switch, a short-circuit for said heating winding, and a thermostatic auxiliary switch arranged in thermal relation with the heat-producing apparatus and adapted to open said short-circuit at a certain temperature of said apparatus.

4. A thermostatic control system comprising an electric heat-producing apparatus, a thermostatic main switch adapted to make and break the circuit of said apparatus, a heating winding for said switch, a sealed receptacle enclosing said switch, a short-circuit for said winding, a thermostatic auxiliary switch arranged in thermal relation with the heat-producing apparatus and adapted to open said short-circuit at a certain temperature, and means for setting the auxiliary switch to open the short-circuit at different temperatures.

5. A thermostatic control system comprising an electric heat-producing apparatus, a main circuit for said apparatus, a thermostatic main switch arranged to control said circuit and provided with a heating winding, said switch and its winding being enclosed in a sealed receptacle and an auxiliary thermostatic switch arranged in thermal relation with the heat-producing apparatus and adapted to be operated at a certain temperature of said apparatus in such a manner as to cause the current of said apparatus to pass through the heating winding.

6. A thermostatic control system comprising an electric heat-producing apparatus, a thermostatic main switch adapted to make and break the circuit of said apparatus and provided with a heating winding, said switch and its winding being enclosed in a sealed receptacle, a short-circuit for said heating winding, and a thermostatic auxiliary switch arranged in thermal relation with the heat-producing apparatus and adapted to open said short-circuit at a certain temperature of said apparatus.

7. A thermostatic control system comprising an electric heat-producing apparatus, a thermostatic main switch adapted to make and break the circuit of said apparatus, a heating winding for said switch connected in series with the heat-producing apparatus, said switch and its winding being enclosed in a sealed receptacle, a short-circuit for said heating winding, a thermostatic auxiliary switch arranged in thermal relation with the heat-producing apparatus and adapted to open said short-circuit at a certain temperature, and means for setting the auxiliary switch to open the short-circuit at different temperatures.

8. A thermostatic control system comprising an electric heat-producing apparatus, a main circuit for said apparatus, a thermostatic main switch included in said main circuit and provided with a heating winding, and a thermostatic auxiliary switch adapted to be operated at the maximum working temperature of said apparatus in such a manner as to cause the current of said apparatus to pass through the heating winding, said main and auxiliary switches being both arranged in thermal relation with the heat-producing apparatus and the main switch being arranged to operate as a thermal cut-out in case the auxiliary switch should fail to work.

9. A thermostatic control system comprising an electric heat-producing apparatus, a thermostatic main switch adapted to make and break the circuit of said apparatus and provided with a heating winding, a short-circuit for said heating winding, and a thermostatic auxiliary switch arranged in thermal relation with the heat-producing apparatus and adapted to open said short-circuit at a certain temperature of said apparatus said main switch being enclosed in a sealed receptacle and arranged in thermal relation with the heat-producing apparatus so as to operate as a thermal cut-out in case the auxiliary switch should fail to operate.

10. A thermostatic control system comprising an electric heat-producing apparatus, a thermostatic main switch adapted to make and break the circuit of said apparatus, a heating winding for said switch, an evacuated receptacle enclosing said switch and said heating-winding, a short-circuit for said winding, a thermostatic auxiliary switch adapted to open said short-circuit at a certain temperature, and means for setting the auxiliary switch to open the short-circuit at different temperatures, said main and auxiliary switches being both arranged in thermal relation with the heat-producing apparatus and the main switch being arranged to operate as a thermal cut-out in case the auxiliary switch should fail to work.

In testimony whereof I affix my signature.

AXEL OSVALD APPELBERG.